US010739909B1

(12) United States Patent
Lin et al.

(10) Patent No.: US 10,739,909 B1
(45) Date of Patent: Aug. 11, 2020

(54) POSITION INPUT SYSTEM AND METHOD

(71) Applicant: HIMAX TECHNOLOGIES LIMITED, Tainan (TW)

(72) Inventors: Chang-Hui Lin, Tainan (TW); Yu-Chun Lin, Tainan (TW); Yaw-Guang Chang, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 16/373,983

(22) Filed: Apr. 3, 2019

(51) Int. Cl.
*G06F 3/041* (2006.01)
*G06F 3/0354* (2013.01)
*G06F 3/038* (2013.01)
*G09G 5/00* (2006.01)

(52) U.S. Cl.
CPC .......... *G06F 3/04162* (2019.05); *G06F 3/038* (2013.01); *G06F 3/03545* (2013.01); *G06F 3/0412* (2013.01); *G09G 5/003* (2013.01); *G06F 2203/0384* (2013.01); *G09G 2320/0257* (2013.01)

(58) Field of Classification Search
CPC .. G06F 3/04162; G06F 3/03545; G06F 3/038; G06F 3/041; G06F 2203/0384; G09G 5/003; G09G 2320/0257
See application file for complete search history.

(56) References Cited

U.S. PATENT DOCUMENTS

| | | | |
|---|---|---|---|
| 9,652,090 B2* | 5/2017 | Tan | G06F 3/044 |
| 10,474,277 B2* | 11/2019 | Pant | G06F 3/03545 |
| 2015/0242040 A1* | 8/2015 | Gu | G06F 3/0412 |
| | | | 345/175 |
| 2017/0060337 A1* | 3/2017 | Kim | G06F 3/0418 |
| 2017/0177145 A1* | 6/2017 | Hara | G06F 3/0416 |
| 2019/0317630 A1* | 10/2019 | Shaw | G06F 3/04166 |

* cited by examiner

*Primary Examiner* — Muhammad N Edun
(74) *Attorney, Agent, or Firm* — Donald E. Stout; Stout, Uxa & Buyan, LLP

(57) ABSTRACT

A position input system includes a touch screen, an active stylus and a driver. The driver transmits an uplink signal to the active stylus via the touch screen in a current touch period, the uplink signal containing timing information that informs the active stylus of timing of a next touch period in which the active stylus transmits a downlink signal to the driver via the touch screen. In another embodiment, the driver transmits an uplink signal to the active stylus via the touch screen in a current touch period of a current frame at a time different from a corresponding touch period of a previous frame.

14 Claims, 6 Drawing Sheets

POSITION INPUT SYSTEM AND METHOD

BACKGROUND OF THE INVENTION

1. Field of the Invention

The present invention generally relates to a touch screen, and more particularly to a position input system and method capable of overcoming the burn-in problem.

2. Description of Related Art

A touch screen is an input/output device that adopts both touch technology and display technology in a single device and has been commonly adapted to electronic devices such as smart phones or tablet computers. The touch screen enables the user to interact directly with what is displayed.

The touch screen ordinarily includes a display driver configured to perform display task and a touch driver configured to perform touch task. A touch with display driver integration (TDDI) driver has been recently proposed to integrate and manufacture the touch driver and the display driver in a single chip, thereby simplifying manufacturing, reducing cost and enhancing reliability.

A stylus, particularly active stylus (or active pen), may be adapted to interacting or communicating with the touch screen. The active stylus is an input device that includes electronic components and allows users to write directly onto the touch screen surface. The active stylus may generate wireless signals that are picked up, digitized and transmitted to a controller (or driver), thereby providing data on pen location, pressure and other functionalities.

Burn-in or image sticking on the touch screen is one of issues to be addressed for TDDI driver due to inherent physical characteristics of some types of touch screen such as amorphous silicon (a-Si) touch screen. Unfortunately, the burn-in or image sticking problem may cause permanent damage to the touch screen.

A need has thus arisen to propose a novel scheme that is capable of overcoming the burn-in or image sticking problem in order to enhance reliability and lifetime of the touch screen.

SUMMARY OF THE INVENTION

In view of the foregoing, it is an object of the embodiment of the present invention to provide a position input system and method capable of overcoming the burn-in or image sticking problem, thereby enhancing reliability and lifetime of a touch screen of a position input system.

According to one embodiment, a position input system includes a touch screen, an active stylus and a driver. The driver transmits an uplink signal to the active stylus via the touch screen in a current touch period. The uplink signal contains timing information that informs the active stylus of timing of a next touch period in which the active stylus transmits a downlink signal to the driver via the touch screen.

According to another embodiment, the driver transmits an uplink signal to the active stylus via the touch screen in a current touch period of a current frame at a time different from a corresponding touch period of a previous frame.

DETAILED DESCRIPTION OF THE INVENTION

Figure 1:
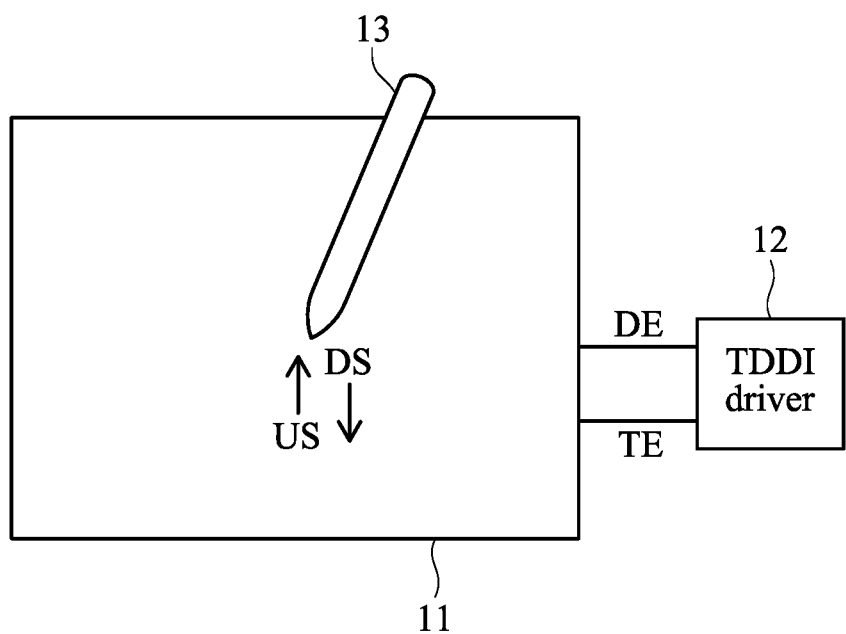
FIG. 1 shows a schematic diagram illustrating a position input system according to one embodiment of the present invention.

FIG. 1 shows a schematic diagram illustrating a position input system 100 according to one embodiment of the present invention. In the embodiment, the position input system 100 may include a touch screen 11 such as amorphous silicon (a-Si) touch screen. The position input system 100 of the embodiment may include a touch with display driver integration (TDDI) driver 12, which integrates a touch driver with a display driver manufactured in a single chip. Specifically, the TDDI driver 12 may issue a display enable signal DE to enable the touch screen 11 to perform display task, and may issue a touch enable signal TE to enable the touch screen 11 to perform touch task. Although the TDDI driver 12 (or touch screen driver in general) is exemplified, it is appreciated that a touch driver and a display driver that are manufactured separately may be used in the embodiment instead.

The position input system 100 may include an active stylus 13 capable of interacting or communicating with the touch screen 11 and the TDDI driver 12. The active stylus 13 may perform bidirectional communication with the TDDI driver 12. Specifically, the TDDI driver 12 may transmit an uplink signal US to the active stylus 13 via the touch screen 11. The active stylus 13 may transmit a downlink signal DS to the TDDI driver 12 via the touch screen 11.

Figure 2:
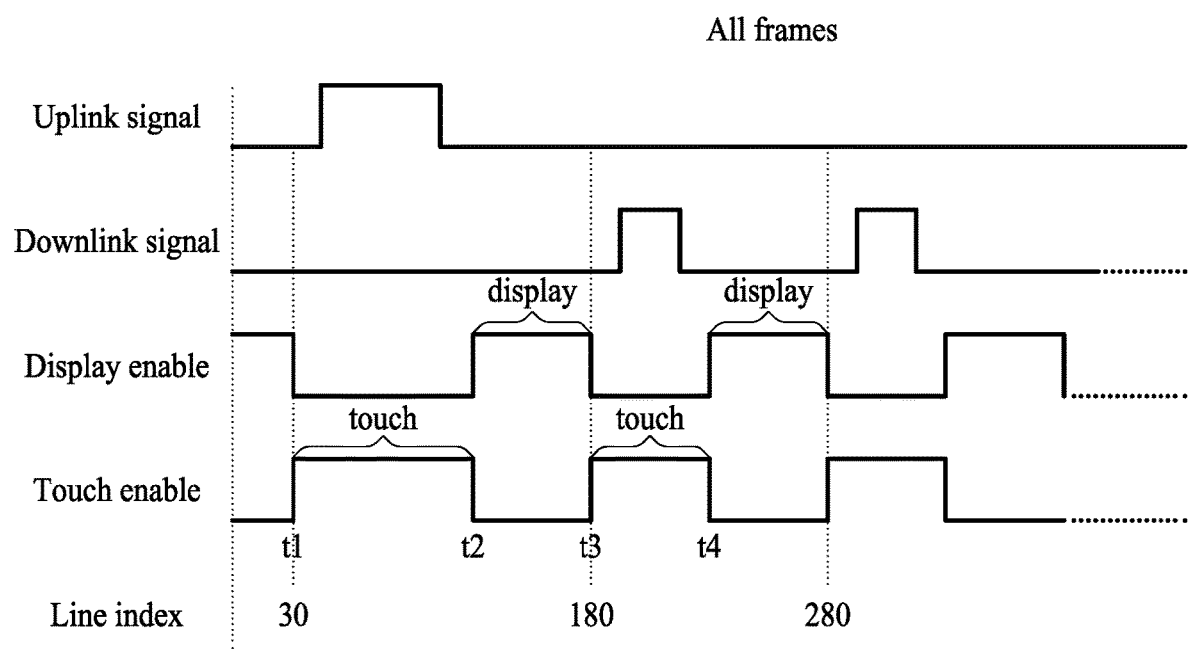
FIG. 2 shows a timing diagram exemplifying pertinent signals of the position input system of FIG. 1 performed in a normal mode.

FIG. 2 shows a timing diagram exemplifying pertinent signals of the position input system 100 of FIG. 1 performed in a normal mode. In a touch period t1-t2 (when the touch enable signal TE is asserted), the TDDI driver 12 transmits an uplink signal US to and synchronizes with the active stylus 13. Subsequently, in a next touch period t3-t4, the active stylus 13 transmits a downlink signal DS to and communicates with the TDDI driver 12. It is noted that, in this normal mode, the timing of transmitting the uplink signal US and the downlink signal DS is fixed through all frames. As a result, the touch screen 11 may suffer from burn-in or image sticking problem.

Figure 3A:
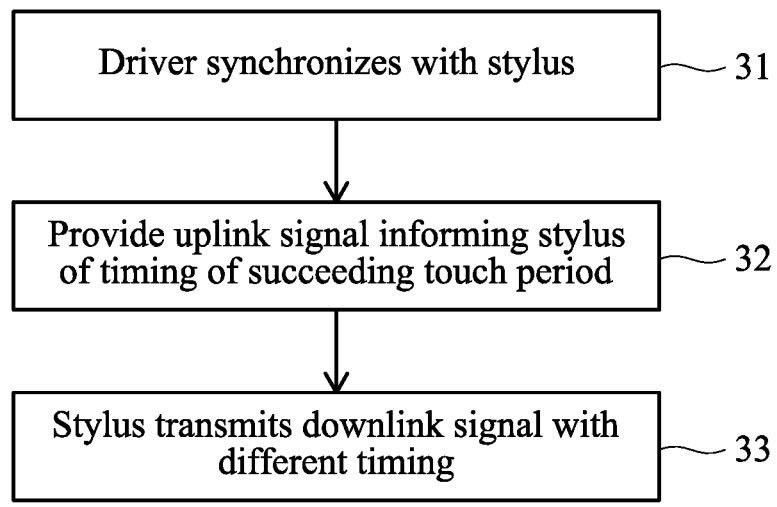
FIG. 3A shows a flow diagram illustrating a position input method capable of overcoming the burn-in or image sticking problem according to a first embodiment of the present invention.
Figure 3B:
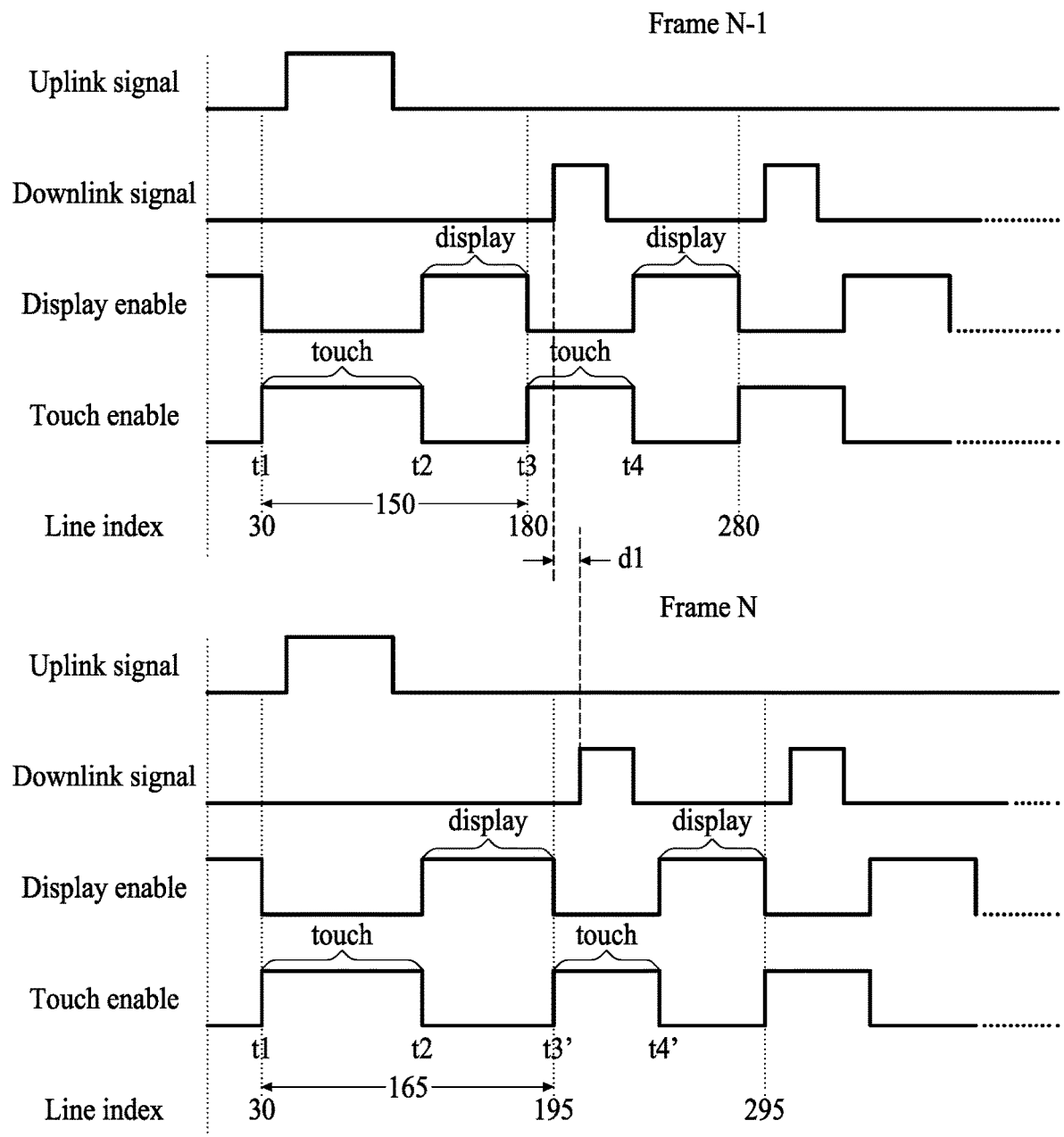
FIG. 3B shows a timing diagram exemplifying pertinent signals of the position input system of FIG. 1 performed according to the position input method of FIG. 3A.

FIG. 3A shows a flow diagram illustrating a position input method 300 capable of overcoming the burn-in or image sticking problem according to a first embodiment of the present invention. The position input method 300 of FIG. 3A may be adaptable to the position input system 100 of FIG. 1. FIG. 3B shows a timing diagram exemplifying pertinent signals of the position input system 100 of FIG. 1 performed according to the position input method 300 of FIG. 3A.

In step 31, in a touch period t1-t2 (when the touch enable signal TE is asserted), the TDDI driver 12 transmits an uplink signal US to and synchronizes with the active stylus 13. According to one aspect of the embodiment, in step 32, the uplink signal US provided by the TDDI driver 12 may further contain timing information that informs the active stylus 13 of timing of a succeeding touch period (that is, time at which the succeeding touch period will happen). As exemplified in FIG. 3B, the uplink signal US provided by the TDDI driver 12 in the current frame N contains timing information that informs the active stylus 13 that the succeeding touch period will happen at a time t3' (or line index 195) different from (e.g., later than) a corresponding time t3 (or line index 180) as in the previous frame N−1.

Subsequently, in step 33, in the next touch period t3'-t4', the active stylus 13 transmits a downlink signal DS to and communicates with the TDDI driver 12 according to the timing information provided in the uplink signal US. As the timing of the next touch period t3'-t4' in the current frame N has been changed or shifted (e.g., delayed) compared to the previous frame N−1, the downlink signal DS is thus transmitted with different timing (e.g., with delay time d1) compared to the previous frame N−1. Accordingly, switching to a touch period will not happen at the same time through the frames, thereby overcoming burn-in or image sticking problem and enhancing reliability of the touch screen 11.

Figure 4A:
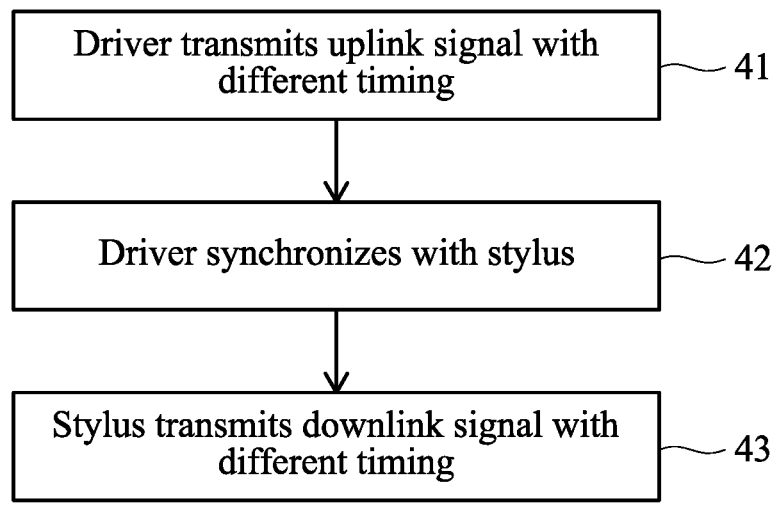
FIG. 4A shows a flow diagram illustrating a position input method capable of overcoming the burn-in or image sticking problem according to a second embodiment of the present invention.
Figure 4B:
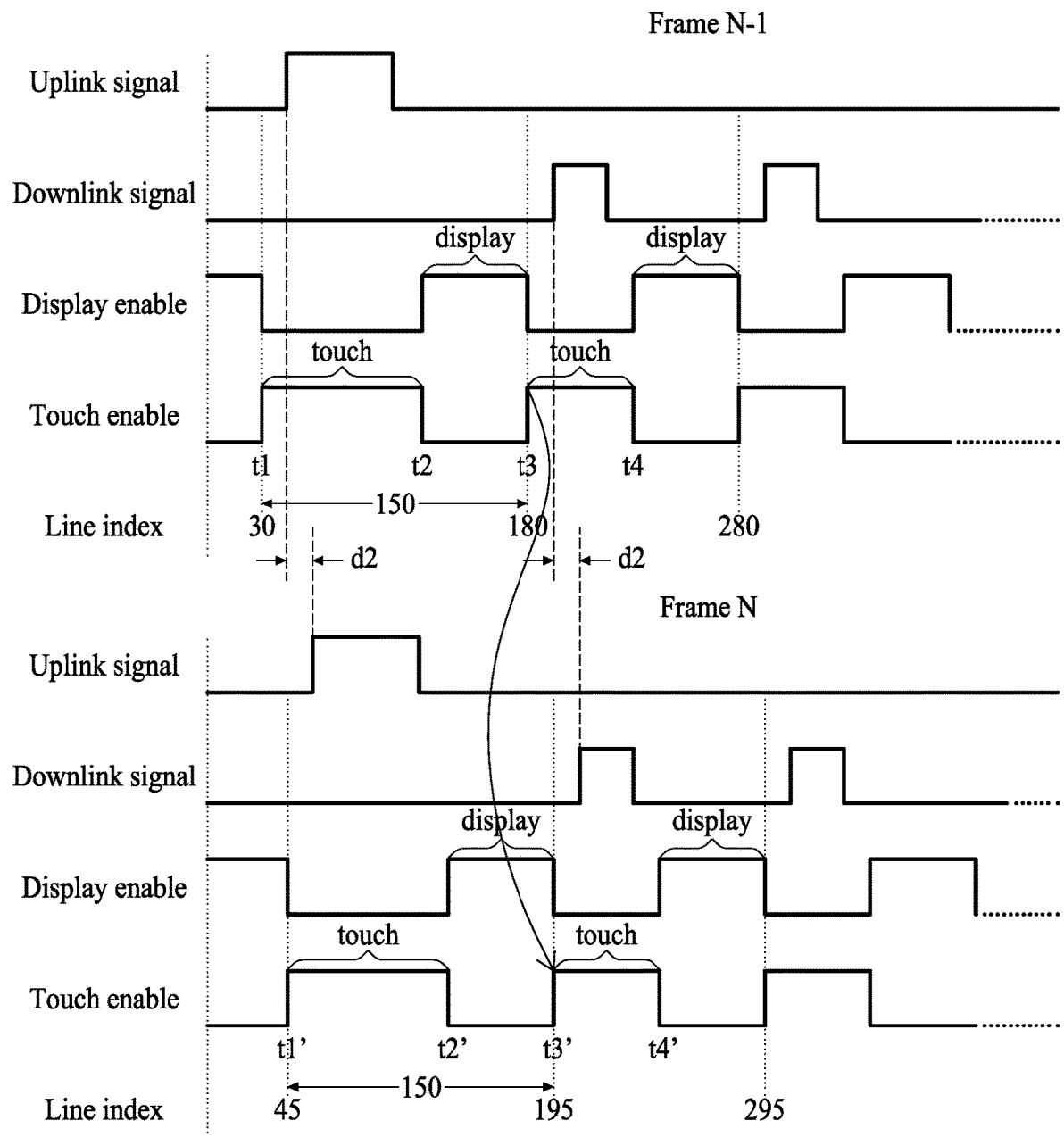
FIG. 4B shows a timing diagram exemplifying pertinent signals of the position input system of FIG. 1 performed according to the position input method of FIG. 4A.

FIG. 4A shows a flow diagram illustrating a position input method 400 capable of overcoming the burn-in or image sticking problem according to a second embodiment of the present invention. The position input method 400 of FIG. 4A may be adaptable to the position input system 100 of FIG. 1. FIG. 4B shows a timing diagram exemplifying pertinent signals of the position input system 100 of FIG. 1 performed according to the position input method 400 of FIG. 4A.

In step 41, in a touch period t1'-t2' (when the touch enable signal TE is asserted), the TDDI driver 12 transmits an uplink signal US to the active stylus 13 via the touch screen 11. According to one aspect of the embodiment, the TDDI driver 12 changes (e.g., delays) timing of the touch period t1'-t2' in the current frame N compared to the corresponding touch period t1-t2 in the previous frame N−1. As a result as exemplified in FIG. 4B, the uplink signal US is thus delayed with d2 compared to the previous frame N−1. The shifted time d2 for each frame may be randomly generated or set beforehand. Subsequently, in step 42, the TDDI driver 12 synchronizes with the active stylus 13 according to the uplink signal US.

Subsequently, in step 43, in the next touch period t3'-t4', the active stylus 13 transmits a downlink signal DS to and communicates with the TDDI driver 12. As the timing of the previous touch period t1'-t2' and the next touch period t3'-t4' in the current frame N have been changed or shifted (e.g., delayed) compared to the previous frame N−1, the downlink signal DS is thus transmitted with different timing (e.g., with delay time d2) compared to the previous frame N−1. That is, compared to the previous frame N−1, the uplink signal US in the previous touch period t1'-t2' of the current frame N is shifted with a time (e.g., d2) that is the same as a time (e.g., d2) with which the downlink signal DS in the next touch period t3'-t4' of the current frame N is shifted. Accordingly, switching to a touch period will not happen at the same time or line through the frames, thereby overcoming burn-in or image sticking problem and enhancing reliability of the touch screen 11.

Generally speaking, according to the first embodiment (FIG. 3A and FIG. 3B) and the second embodiment (FIG. 4A and FIG. 4B), the TDDI driver 12 of the present invention changes timing of switching to a touch period through frames by either informing the active stylus 13 (as in the first embodiment) or not informing the active stylus 13 (as in the second embodiment). As a result, the active stylus 13 transmits the downlink signal DS with different timing through the frames. Accordingly, the present invention can overcome burn-in or image sticking problem and enhance reliability of the touch screen 11.

Although specific embodiments have been illustrated and described, it will be appreciated by those skilled in the art that various modifications may be made without departing from the scope of the present invention, which is intended to be limited solely by the appended claims.

What is claimed is:

1. A position input system, comprising:
   a touch screen;
   an active stylus communicating with the touch screen; and
   a driver that transmits an uplink signal to the active stylus via the touch screen in a current touch period, the uplink signal containing timing information that informs the active stylus of timing of a next touch period in which the active stylus transmits a downlink signal to the driver via the touch screen;
   wherein the driver transmits the uplink signal in a current frame at the same time as in a previous frame, and the active stylus transmits the downlink signal in the current frame at a time different from the previous frame.

2. The system of claim 1, wherein the driver comprises a touch with display driver integration (TDDI) driver.

3. The system of claim 1, wherein the touch screen comprises an amorphous silicon (a-Si) touch screen.

4. The system of claim 1, wherein the timing information of a current frame is different from the timing information of a previous frame.

5. A position input method, comprising:
   transmitting an uplink signal by a driver to an active stylus via a touch screen in a current touch period;
   providing timing information contained in the uplink signal to inform the active stylus of timing of a next touch period; and
   transmitting a downlink signal by the active stylus to the driver via the touch screen according to the provided timing information;
   wherein the driver transmits the uplink signal in a current frame at the same time as in a previous frame, and the active stylus transmits the downlink signal in the current frame at a time different from the previous frame.

6. The method of claim 5, wherein the driver comprises a touch with display driver integration (TDDI) driver.

7. The method of claim 5, wherein the timing information of a current frame is different from the timing information of a previous frame.

8. A position input system, comprising:
   a touch screen;
   an active stylus communicating with the touch screen; and
   a driver that transmits an uplink signal to the active stylus via the touch screen in a current touch period of a current frame at a time different from a corresponding touch period of a previous frame;
   wherein the uplink signal in the current frame is shifted compared to the previous frame with a time that is the same as a time with which a transmitted downlink signal in the current frame is shifted compared to the previous frame.

9. The system of claim 8, wherein the driver comprises a touch with display driver integration (TDDI) driver.

10. The system of claim 8, wherein the touch screen comprises an amorphous silicon (a-Si) touch screen.

11. The system of claim 8, wherein the active stylus transmits a downlink signal in the current frame at a time different from the previous frame.

12. A position input method, comprising:
- transmitting an uplink signal by a driver to the active stylus via a touch screen in a current touch period of a current frame, said uplink signal being transmitted at a time different from a corresponding touch period of a previous frame; and
- transmitting a downlink signal by the active stylus to the driver via the touch screen, said downlink signal being transmitted in the current frame at a time different from the previous frame.

13. The method of claim 12, wherein the driver comprises a touch with display driver integration (TDDI) driver.

14. The method of claim 12, wherein the uplink signal in the current frame is shifted compared to the previous frame with a time that is the same as a time with which a transmitted downlink signal in the current frame is shifted compared to the previous frame.

\* \* \* \* \*